No. 683,200. Patented Sept. 24, 1901.
E. S. DORÉ & G. EVANOVITCH.
MOTOR VEHICLE.
(Application filed May 20, 1901.)
(No Model.)
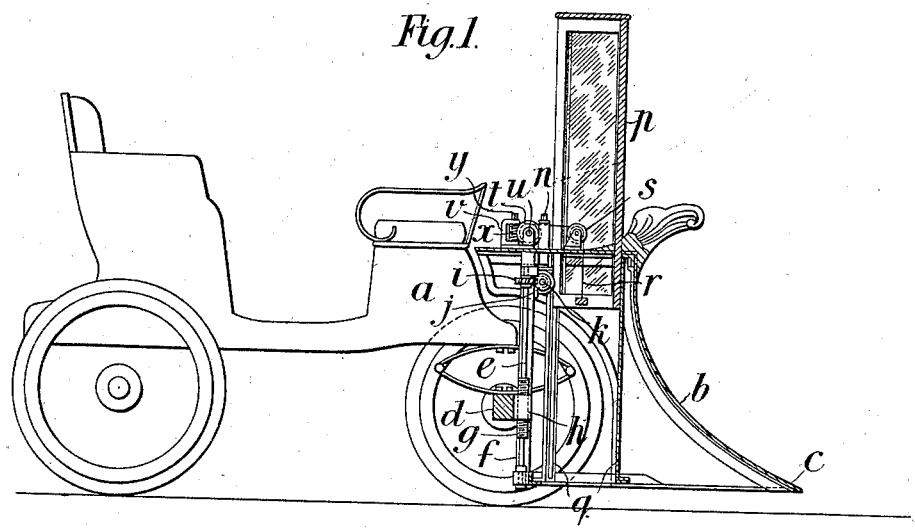
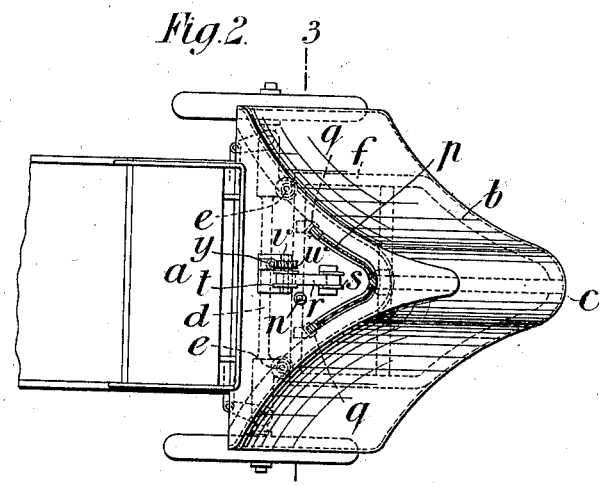
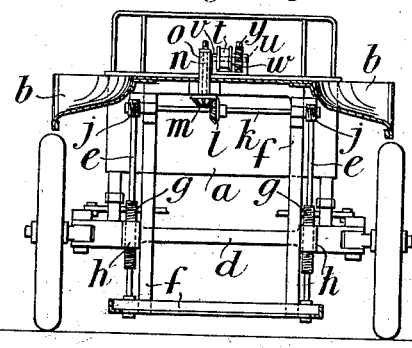
Witnesses.
J. K. Moore
B. W. Brockett.
Inventors.
Edwin Stephen Doré and
Gusser Evanovitch
By Whitaker & Prevost Attys.

UNITED STATES PATENT OFFICE.

EDWIN STEPHEN DORÉ AND GUSSER EVANOVITCH, OF LONDON, ENGLAND; SAID EVANOVITCH ASSIGNOR TO LISSIE ANNE EVANOVITCH, OF SAME PLACE.

MOTOR-VEHICLE.

SPECIFICATION forming part of Letters Patent No. 683,200, dated September 24, 1901.

Application filed May 20, 1901. Serial No. 61,171. (No model.)

*To all whom it may concern:*

Be it known that we, EDWIN STEPHEN DORÉ, a subject of the King of Great Britain, residing at 80 King William street, London, and GUSSER EVANOVITCH, a citizen of the United States, residing at 29 St. James Square, Notting Hill, London, England, have invented new and useful Improvements in or Connected with Motor Road-Vehicles, of which the following is a specification.

This invention relates to improvements in motor road-vehicles, and has for its object to provide means whereby the retardation in the velocity of such vehicles due to the resistance of the air is diminished and the liability of injury to pedestrians in crowded thoroughfares greatly reduced.

According to the invention we fit to the front of the vehicle a kind of guard or shield, approximately V or double-crescent shaped in horizontal section—that is to say, which tapers outward from its front part or nose in the backward direction and preferably also from below upward in such a manner that when the vehicle is in motion the air which comes into contact with the said guard or shield is divided and directed laterally toward the sides of the vehicle, outside the wheels. With this arrangement the resistance to the motion of the vehicle is considerably reduced and should the guard come into contact with any object or person the said object or person is thrown aside from the vehicle in motion and out of the way of the wheels thereof, so that serious accidents are prevented.

In carrying out the invention the guard is secured to the axle of the front or steering wheels of the vehicle and is advantageously made adjustable, so that the distance of its lower part from the ground can be altered to suit requirements, being brought nearer to the ground when the vehicle is traveling over smooth surfaces and raised to a greater distance therefrom when the vehicle is passing over uneven ground. In some cases the guard may be arranged so that it can be raised to a sufficient height to enable its upper part to serve as a shield to the occupant of the car, or the said guard may be provided with an extension-piece which may be temporarily or permanently fitted thereto.

In the accompanying drawings, Figure 1 is a sectional side elevation of a motor road-vehicle having our guard or shield applied thereto. Fig. 2 is a plan view of the guard and the fore part of the vehicle. Fig. 3 is a section on the line 3 3, Fig. 2.

*a* is the body of the vehicle, and *b* is the guard or shield, which, as shown, is approximately V or double-crescent shaped in horizontal section, tapering outwardly from its front or nose *c* in the backward direction and also curving inward and backward from below upward, as will be clearly seen in Fig. 2.

In the arrangement shown in the drawings the guard *b* is secured to the front-wheel axle *d* of the vehicle by means of two upright rods *e e*, which are mounted at their upper and lower ends in bearings in a frame *f*, secured to the inside of the guard or shield *b*, which is made hollow for the sake of lightness and may be of any suitable tough and light material. These rods *e e* are screw-threaded, as shown at *g g*, for a portion of their length, the said screw-threaded portions engaging internally-screw-threaded nuts or lugs *h h* upon the axle *d*. At the upper ends the rods *e e* have keyed upon them worm-wheels *i i*, which engage worms *j j* upon a transverse spindle *k*, which also has keyed upon it a bevel-wheel *l*, gearing with a bevel-wheel *m* upon a spindle *n*, mounted in a bearing *o*, secured to the top of the guard or shield *b*. The spindle *n* has a squared end, so that a key or handle can be fitted upon it to rotate it, and thereby rotate the spindle *k*, and thus turn the spindles *e e*, so as to cause them to move up or down, as the case may be, in the lugs *h h* and raise or lower the guard as may be desired. We wish it to be understood, however, that we do not confine ourselves to this particular mode of attaching and raising and lowering the guard *b*, as it will be obvious that the same results may be attained by other means.

*p* is the extension-shield, which we sometimes provide for protecting the occupants of the car against wind and dust when necessary. This extension-guard *p* comprises a glazed frame curved to suit the front of the guard b and arranged to slide in upright guides q q, provided inside the guard or shield b, as clearly seen in Fig. 1, whereby when not required for use it can be slid down inside the said guard, so as to be invisible, and when required for use can be raised to the height desired. This, in the arrangement shown in the drawings, is effected by means of the strap r, which is secured at one end to the bottom of the extension-guard p, passes over a guide-pulley s, secured to the top of the guard or shield b, and thence backward over a pulley t upon a spindle u, mounted in a bracket v, fixed to the top of the guard b. A worm-wheel w is keyed upon the spindle u and gears with a worm x, mounted in the bracket v, the worm-spindle having a squared end y to take a key, by means of which it can be turned, so as to raise or lower the extension-guard p. As above mentioned, the extension-guard instead of being permanently fitted to the main guard or shield b can be temporarily fitted thereto in any suitable manner.

A motor road-vehicle having our guard or shield fitted thereto has very much less resistance offered to its motion through the air than is usually the case, as when the said guard comes into contact with the air it divides it and directs it laterally toward the sides of the vehicle outside the wheels. Furthermore, should the guard come into contact with any object or person the said object or person is thrown aside from the moving vehicle and clear of the wheels, so that serious accidents are to a large extent prevented. When the wind is in the right direction, the shield may be used as a "sail," and for this purpose can be made movable, so that its position can be adjusted to catch the wind.

A further advantage of the invention is that the guard or shield can be formed artistically, so as to materially enhance the appearance of the vehicle to which it is fitted.

Having now particularly described and ascertained the nature of our said invention and in what manner the same is to be performed, we declare that what we claim is—

1. The combination with a motor road-vehicle of a guard or shield of approximately V or double-crescent shape in horizontal section, the said guard being secured to the front-wheel axle and being provided with means for raising or lowering it relatively with the said axle, substantially, as, and for the purpose, hereinbefore described.

2. In a motor road-vehicle, the combination with a guard or shield fitted to the front-wheel axle, of upright screw-threaded rods which engage screw-threaded lugs or nuts upon the axle and of means for rotating the said rods, substantially as, and for the purpose, hereinbefore described.

3. In a motor road-vehicle, the combination with a front guard or shield fitted to the front axle thereof of an additional guard which telescopes in the main guard, substantially as, and for the purpose, hereinbefore described.

4. In a motor-vehicle the combination with a main guard or shield, supported in front of the body of the vehicle, of a supplemental wind-guard, adapted to be raised above the body of the vehicle to protect the occupants of the vehicle from wind and dust, and means for adjusting said supplemental guard vertically, substantially as described.

5. In a motor-vehicle the combination with a main guard or shield supported in front of the body of the vehicle, of a supplemental wind-guard, telescoping in the main guard, and adapted to be raised above the body of the vehicle to protect the occupants from wind and dust, and means for adjusting said supplemental guard vertically, substantially as described.

6. In a motor-vehicle, the combination with a main guard adjustably secured to the vehicle mechanism for adjusting said guard vertically, a supplemental guard connected with said main guard and adapted to move vertically with respect thereto and mechanism for adjusting said supplemental guard vertically with respect to the main guard, substantially as described.

EDWIN STEPHEN DORÉ.
GUSSER EVANOVITCH.

Witnesses:
JOHN E. BOUSFIELD,
C. G. REDFERN.